United States Patent Office 3,510,451
Patented May 5, 1970

3,510,451
STABILIZED POLYPROPYLENE COMPOSITIONS
Toshio Seki, Osaka-shi, and Kozaburo Suzuki, Kobe-shi, Japan, assignors to Nitto Kasei Co., Ltd., Osaka, Japan, a corporation of Japan
No Drawing. Filed Nov. 8, 1967, Ser. No. 681,555
Claims priority, application Japan, Nov. 8, 1966, 41/73,032
Int. Cl. C08f 45/58
U.S. Cl. 260—45.75                         23 Claims

ABSTRACT OF THE DISCLOSURE

This invention relates to a heat and light resistant polypropylene composition comprising a polypropylene and, as the stabilizing mixture therefor, about 0.01% to about 5.0% by weight of the polypropylene of (a), as an ultraviolet absorber, a compound of the formula

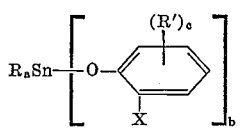

wherein R is a radical selected from the group consisting of alkyl of 1–12 carbon atoms, cycloalkyl, aryl, and benzyl, X is selected from the group consisting of residues of the formulae

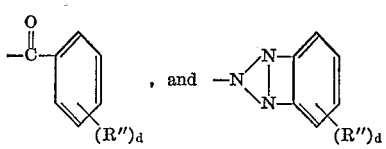

R' and R'' are each selected from the group consisting of alkyl of 1–12 carbon atoms, alkoxyl of 1–12 carbon atoms, phenyl, and oxygen exhibiting a direct bond to said Sn atom, $a$ and $b$ are each an integer from 1 to 3, and $c$ and $d$ are each an integer from 0 to 2;

about 0.01% to about 5.0% by weight of the polypropylene of (b), as an anti-discoloring agent, a compound of the formula $$(RO)_3P$$

wherein R is selected from the group consisting of hydrogen, alkyl of 1–18 carbon atoms, phenyl, alkaryl, and benzyl;

about 0.01% to about 2.0% by weight of the polypropylene of (c), as antioxidant, a compound of the formula

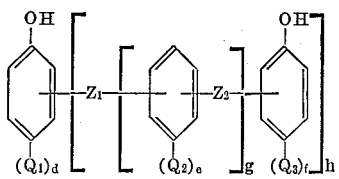

wherein $Q_1$, $Q_2$, and $Q_3$ are each selected from the group consisting of hydroxyl, alkyl, of 1–12 carbon atoms, alkoxyl of 1–12 carbon atoms, and radicals of the formulae

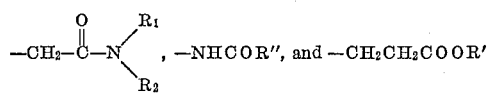

in which when not less than two radicals of each of $Q_1$, $Q_2$, and $Q_3$ attach to a benzene nucleus, they may be the same or different and R', R'', $R_1$, and $R_2$ are each alkyl of 1–18 carbon atoms, $Z_1$ and $Z_2$ are each selected from the group consisting of sulfur, oxygen, and alkylene of 1–4 carbon atoms, $d$, $e$, $f$, and $g$ are each an integer 1–3, and $h$ is an integer 0–1; and about 0.01% to about 2.0% by weight of the polypropylene of (d), as a peroxide decomposer, a compound of the formula $$S(RCOOR')_2$$

wherein R is alkylene of 1–12 carbon atoms, and R' is alkyl of 1–18 carbon atoms.

This invention relates to polypropylene compositions having improved color stability to the degradative effects of heat and light.

The exposure of polyolefine to heat and light usually causes its discoloration, color fading of dyed fibers, lowering of the mechanical strength of molded articles, cloudiness of films, etc. In order to overcome such deficiencies, antioxidants of the phenol or sulfur type and ultraviolet absorbers of the benzophenone, salicylic acid or triazole type have been used; however, these heat and light stabilizers may be characterized by unsatisfactory stabilizing ability because of thermal decomposition, volatilization, and sublimation during the process of producing films, fibers, or other molded articles. Such phenomena may be observed more phenomenally at a processing temperature above 200° C.

We had already developed as an excellent light stabilizer for synthetic resin an organotin ultraviolet absorber having the general formula

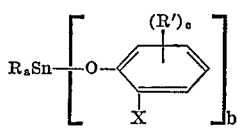

wherein R is a radical selected from the group consisting of alkyl of 1–12 carbon atoms, cycloalkyl, aryl, and benzyl, X is selected from the group consisting of residues of the formulae

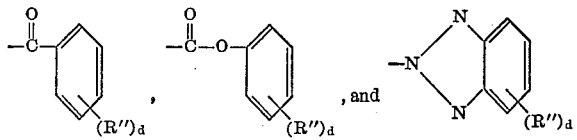

R' and R'' are each selected from the group consisting of alkyl of 1–12 carbon atoms, alkoxyl of 1–12 carbon atoms, phenyl, hydroxyl, and halogen in which the hydroxyl group may be attached to the organotin moiety, $a$ and $b$ are each an integer from 1 to 3, and $c$ and $d$ are each an integer from 0 to 2.

Polypropylene containing the U.V. absorber, however, has unsatisfactory stability against the deleterious effect of heat as discoloring gray to dark gray when treated at about 300° C. It may be considered to be due to the reaction of commonly used antioxidants of sulfur or phenol type with the above mentioned organotin ultraviolet absorber.

The object of this invention is to reduce or eliminate such an adverse effect and the invention relates to a heat and light resistant polypropylene composition which comprises a polypropylene and, as the stabilizing mixture therefor, (a) As an ultraviolet absorber, a compound of the formula

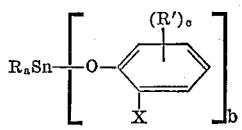

wherein R is a radical selected from the group consisting of alkyl of 1–12 carbon atoms, cycloalkyl, aryl, and benzyl, X is selected from the group consisting of residues of the formulae

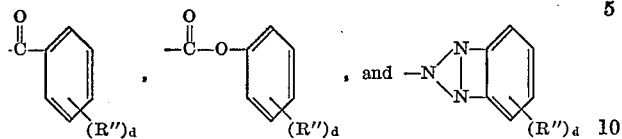

R' and R'' are each selected from the group consisting of alkyl of 1–12 carbon atoms, alkoxy of 1–12 carbon atoms, phenyl, hydroxyl, and halogen in which the hydroxyl group may be attached to the organotin moiety, $a$ and $b$ are each an integer from 1 to 3, and $c$ and $d$ are each an integer from 0 to 2;

(b) As an anti-discoloring agent, a compound of the formula $$(RO)_3P$$

wherein R is selected from the group consisting of hydrogen, alkyl of 1–18 carbon atoms, phenyl, alkaryl, and benzyl;

(c) As an antioxidant, a compound of the formula

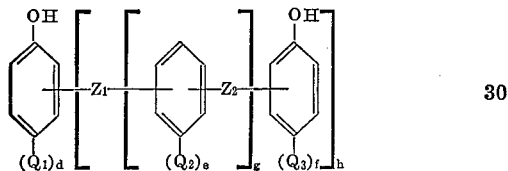

wherein $Q_1$, $Q_2$, and $Q_3$ are each selected from the group consisting of hydroxyl, alkyl of 1–12 carbon atoms, alkoxyl of 1–12 carbon atoms, and radicals of the formulae

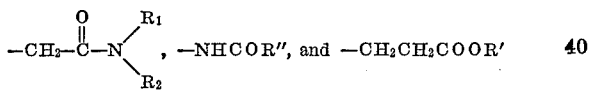

in which when not less than two radicals of each of $Q_1$, $Q_2$, and $Q_3$ attach to a benzene nucleus, they may be the same or different and R', R'', $R_1$, and $R_2$ are each alkyl of 1–18 carbon atoms, $Z_1$ and $Z_2$ are each selected from the group consisting of sulfur, oxygen, and alkylene of 1–4 carbon atoms, $d$, $e$, $f$, and $g$ are each an integer 1–3, and $h$ is an integer 0–1; and (d) As a peroxide decomposer, a compound of the formula $$S(RCOOR')_2$$

wherein R is alkylene of 1–12 carbon atoms, and R' is alkyl of 1–18 carbon atoms.

Illustrative of the organophosphorus compounds within the scope of the foregoing formula (b) that are useful in the invention are the following:

| | |
|---|---|
| Di-lauryl hydrogen phosphite | $(C_{12}H_{25}O)_2POH$ |
| Tributyl phosphite | $(C_4H_9O)_3P$ |
| Tris-(2-ethylhexyl) phosphite | $(C_8H_{17}O)_3P$ |
| Tridecyl phosphite | $(C_{10}H_{21}O)_3P$ |
| Tris-(nonylphenyl) phosphite | $\left(H_{19}C_9\text{—}\bigcirc\text{—}O\right)_3P$ |
| Triphenyl phosphite | $\left(\bigcirc\text{—}O\text{—}\right)_3P$ |
| Tribenzyl phosphite | $\left(\bigcirc\text{—}CH_2O\right)_3P$ |
| Diphenyl decylphosphite | $\left(\bigcirc\text{—}O\text{—}\right)_2POC_{10}H_{21}$ |

Illustrative of the organotin compounds within the scope of the foregoing formula (a) that are useful are the following:

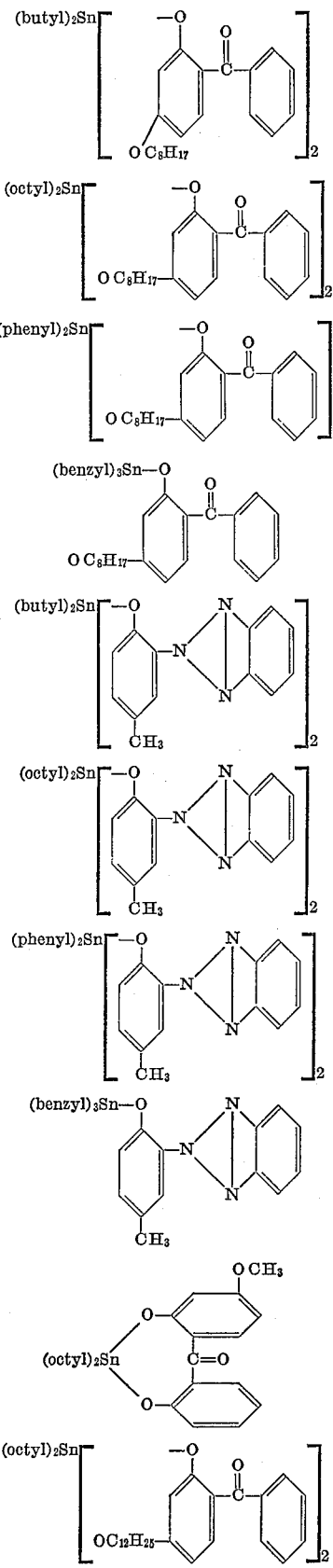

In these formulae, butyl signifies a butyl radical, octyl is an octyl radical phenyl is a phenyl radical and benzyl is a benzyl radical.

The amount of each of the anti-discoloring agent and the ultraviolet absorber to be employed in the process of this invention is in the range of 0.01–5.0 parts by weight per 100 parts by weight of polypropylene, preferably in the range of 0.1–1.0 part by weight, which will vary depending upon the kind of molded articles and the mode of their use.

Illustrative of the useful phenolic compounds within the scope of the foregoing formula (c) are the following:

2,6-di-t-butyl-4-methylphenol
2,6-di-t-butyl-4-butylphenol
2,6-di-tamyl-4-methylphenol
2,6-di-t-butyl-4-ethylphenol
2,4-di-isooctylphenol
2-methoxy-6-ethylphenol
2,2'-methylene-bis-(4-methyl-6-t-butylphenol)
4,4'-methylene-bis-(2,6-di-isopropylphenol)
4,4'-thiobis-(2-t-butyl-6-methylphenol)
2,2'-thiobis-(6-t-butyl-4-methylphenol)
N,N'-di-(n-dodecyl)-3,5-di-t-butyl-4-hydroxyphenyl-acetamide

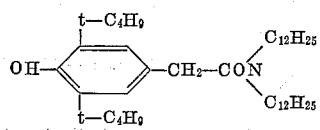

N-stearoyl-p-aminophenol

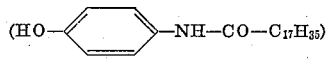

3,5-di-t-butyl-4-hydroxyphenyl propionic acid octyl

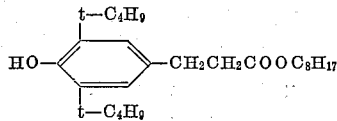

Illustrative of the useful sulfur containing compounds within the scope of the foregoing formula (d) are the following:

Dilauryl-β-thiodipropionate
Distearyl-β-thiodipropionate

The added amount of each of the antioxidant and the peroxide decomposer is in the range of 0.01–2.0 parts by weight per 100 parts by weight of polypropylene.

The molded article formed by the practice of this invention exhibits a fair white color, while the one obtained from the same polypropylene composition without the addition of organophosphorus compound is discolored considerably. In order to obtain the compositions of this invention, each raw material is mixed in a Henschel mixer, a ribbon screw mixer, or a V-type mixer.

Unless otherwise indicated, parts of materials are expressed in terms of parts by weight.

EXAMPLE 1

Sample A was made by mixing in a Henschel mixer the following:

| | Parts |
|---|---|
| Polypropylene (having intrinsic viscosity of 2.10 as measured on Tetraline solution at 135° C.) | 100 |
| 2,6-di-t-butyl-4-methylphenol (trade name: Ionol) | 0.1 |
| Dilauryl thiodipropionate | 0.4 |
| Dibutyltin bis-(2-benzoyl-5-octoxyphenoxide) | 0.3 |
| Tris-(2-ethylhexyl) phosphite | 0.3 |

For purposes of comparison, sample B was made by mixing in a Henschel mixer the following:

| | Parts |
|---|---|
| Polypropylene | 100 |
| Ionol | 0.1 |
| Dilauryl thiodipropionate | 0.4 |
| Dibutyltin bis-(2-benzoyl-5-octoxyphenoxide) | 0.3 |

For comparison sample C was made by mixing in a Henschel mixer the following:

| | Parts |
|---|---|
| Polypropylene | 100 |
| Ionol | 0.1 |
| Dilauryl thiodipropionate | 0.4 |

For comparison, sample D was prepared from polypropylene without the addition of any additives.

Sheets 0.8 mm. thick were made by milling samples A, B, C and D on a mixing roll heated to 150±0.5° C. For heat stability test, grains 0.8 mm.³ formed from these sheets were placed into test tubes of 5 mm. in inside diameter and 8 mm. in outside diameter, and the discoloration was observed one hour after the test tubes were put into oil heated to 270° C. The sheets were also tested in a fade-o-meter (equipped with a xenon lamp, free from ultraviolet rays below the wavelength of 300 mμ) for light resistance, being irradiated for 500 hours and for 1,000 hours.

TABLE I

| | Color of grains | | Appearance of sheet | |
|---|---|---|---|---|
| Sample | Original sheet | Heated 270° C./1 hr. | Lighted 500 hrs. | Lighted 1,000 hrs. |
| A | Pure white | Pure white | No changes | No changes, white, no cracks. |
| B | do | Dark gray | Slightly yellow, no other changes. | Slightly yellow, no cracks, not broken when fingered. |
| C | do | Gray | A few cracks | A lot of cracks broken when fingered. |
| D | Light yellow | Brown | A lot of cracks broken when fingered; dark yellow. | |

EXAMPLE 2

0.4 part of dilauryl thiodipropionate, 0.1 part of Ionol, 0.3 part of dibutyltin bis-(2-benzotriazolyl-4-methylphenoxide) and 0.3 part of tris-(2-ethylhexyl)-phosphite were added to 100 parts of polypropylene with 2.10 of intrinsic viscosity measured in Tetraline solution at 135° C., and treated in the same way as in Example 1 and the mixture hereinafter called sample E. 0.4 part of dilauryl thiodipropionate, 0.1 part of Ionol and 0.3 part of dibutyltin bis(2-benzotriazolyl-4-methylphenoxide) were added to such polypropylene and similarly treated and the mixture hereinafter called sample F.

Samples C and D were melted to be spun for comparison with samples E and F. The fibers made from samples C, E, and F were pure white-colored, while the fiber from sample D was light yellow-colored. Heat resistance was examined on these fibers in the same way as in Example 1. Moreover, in order to examine the light resistance, these fibers were washed by detergents of anion type or nonion type and dried in the sun repeatedly, and discoloration and tensile strength of the fibers were determined (based on that of sample D being 1 after 1,000 hours exposure to ultraviolet rays by xenon lamp). The results are as follows:

TABLE II

| Sample | Original | Discoloration after 1 hr. at 270° C. | Light resistance in washing time | Tensile strength |
|---|---|---|---|---|
| E | Pure white | Pure white | No changes in more than 30 time washings. | 35 |
| F | do | Yellow | Yellow in 30 time washings. | 35 |
| C | do | Dark white | Yellow in 20 time washings. | 18 |
| D | Light yellow | Brown | Yellow in 10 time washings. | 1 |

EXAMPLE 3

0.4 part of dilauryl thiodipropionate, 0.1 part of Ionol, 0.3 part of dioctyltin bis-(2-benzoyl-5-dodecyloxyphenoxide) and 0.3 part of diphenyldecylphosphite were added to 100 parts of polypropylene with 2.10 of intrinsic viscosity measured in Tetraline solution at 135° C., and the mixture treated in the same way as in Example 1 is hereinafter called sample G. Sample H was made in the same way as Example 1 except adding no diphenyldecylphosphite. Sample I was made in the same way as in sample G except replacing dioctyltin bis-(2-benzoyl-5-dodecyloxyphenoxide) by 0.3 part of dioctyltin bis-(2-benzotriazolyl-4-methylphenoxide). Samples C and D were also used for comparison. Each example was put into test tubes with 5 mm. inside diameter and 7 mm. outside diameter and treated at 270° C. for 60 minutes in the atmosphere of nitrogen gas. After that, films with 1 mm. thick, 10 mm. wide and 40 mm. long were made to be examined on oxidation stability in Geer aging tester with heat wind circulation mechanism at 140° C. The same films were put into a fade-o-meter with carbon arc lamp as light source and examined on light stability at 40° C. The results are shown in Table 3. In the table, degradation time in a Geer aging tester means the time till white-colored powder come out on the surface of the films or cracks are brought about. The test results by a fade-o-meter are shown by the time till the proportion of infrared absorption degree (E 1710 cm.$^{-1}$/E 970 cm.$^{-1}$) of the films reaches to 0.1 after infra-red absorption spectra of the exposed films are measured.

TABLE III

| Sample | Discoloration after 1 hr. at 270° C. | Film | Results of aging test (hours) | Results in fadeometer (hour) |
|---|---|---|---|---|
| G | Pure white | White | 1,320 | Over 1,000 |
| H | Light yellow | Light yellow | 1,050 | Over 1,000 |
| I | Pure white | White | 1,470 | Over 1,000 |
| C | Dark white | Dark white | 700 | 400 |
| D | Light yellow | Yellow | 20 | 72 |

What is claimed is:

1. A stabilizing composition comprising:
(A) an organotin compound of the general formula:

$$\left[ R_a Sn \left[ O - \underset{X}{\underset{|}{\bigcirc}} (R')c \right]_b \right]$$

wherein R is a radical selected from the group consisting of alkyl of 1–12 carbon atoms, aryl, and benzyl, X is selected from the group consisting of residues of the formulae:

$$-\overset{O}{\underset{\|}{C}}-\bigcirc(R'')_d \quad \text{and} \quad -N\overset{N}{\underset{N}{\diagdown}}\bigcirc(R'')_d$$

wherein R' and R'' are each selected from the group consisting of alkyl of 1–12 carbon atoms, alkoxy of 1–12 carbon atoms, phenyl, and oxygen exhibiting a direct bond to said Sn atom, $a$ and $b$ are each an integer from 1 to 3, and $c$ and $d$ are each an integer from 0 to 2;

(B) a compound of the formula:

$$(RO)_3$$

wherein R is selected from the group consisting of hydrogen, alkyl of 1–18 carbon atoms, phenyl, alkaryl, and benzyl;

(C) a compound of the formula:

$$\underset{(Q_1)_d}{\overset{OH}{\bigcirc}} - Z_1 - \left[ \underset{(Q_2)_e}{\bigcirc} \right]_g - Z_2 - \underset{(Q_3)_f}{\overset{OH}{\bigcirc}} \Big]_h$$

wherein $Q_1$, $Q_2$, and $Q_3$ are each selected from the group consisting of alkyl of 1–12 carbon atoms, alkoxy of 1–12 carbon atoms, radicals of the formulae:

$$-CH_2-\overset{O}{\underset{\|}{O}}-N\overset{R_1}{\underset{R_2}{\diagdown}}, \quad -NHCOR'', \quad \text{and} \quad -CH_2CH_2COOR'$$

in which when not less than two radicals of each of $Q_1$, $Q_2$, and $Q_3$ attach to a benzene nucleus, they may be the same or different and R', R'', $R_1$, and $R_2$ are each alkyl of 1–18 carbon atoms, and hydroxyl such that not more than two of $Q_1$, $Q_2$, and $Q_3$ are hydroxyl when $h$ is 1, $Z_1$ and $Z_2$ are each selected from the group consisting of sulfur, oxygen, and alkylene of 1–4 carbon atoms, $d$, $e$, $f$, and $g$ are each an integer 1–3, and $h$ is an integer 0–1; and (D) a compound of the formula:

$$S(RCOOR')_2$$

wherein R is alkylene of 1–12 carbon atoms, and R' is alkyl of 1–18 carbon atoms.

2. A stabilizing composition as claimed in claim 1 wherein R is an alkyl group of 1–12 carbon atoms.

3. A composition as claimed in claim 1 wherein the organotin compound (A) is $$\left[ (butyl)_2 Sn \left[ \begin{array}{c} -O \\ \bigcirc - \overset{O}{\underset{\|}{C}} - \bigcirc \\ OC_8H_{17} \end{array} \right]_2 \right]$$

4. A composition as claimed in claim 1 wherein the organotin compound (A) is $$\left[ (octyl)_2 Sn \left[ \begin{array}{c} -O \\ \bigcirc - \overset{O}{\underset{\|}{C}} - \bigcirc \\ OC_8H_{17} \end{array} \right]_2 \right]$$

5. A composition as claimed in claim 1 wherein the organotin compound (A) is $$\left[ (phenyl)_2 Sn \left[ \begin{array}{c} -O \\ \bigcirc - \overset{O}{\underset{\|}{C}} - \bigcirc \\ OC_8H_{17} \end{array} \right]_2 \right]$$

6. A composition as claimed in claim 1 wherein the organotin compound (A) is

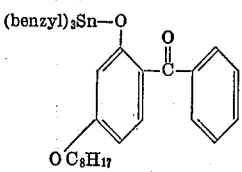

7. A composition as claimed in claim 1 wherein the organotin compound (A) is

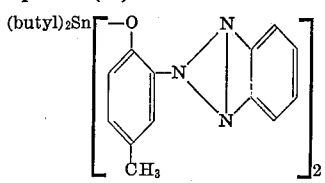

8. A composition as claimed in claim 1 wherein the organotin compound (A) is

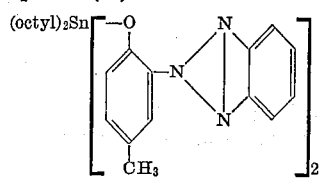

9. A composition as claimed in claim 1 wherein the organotin compound (A) is

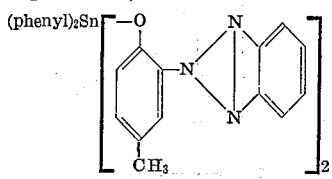

10. A composition as claimed in claim 1 wherein the organotin compound (A) is

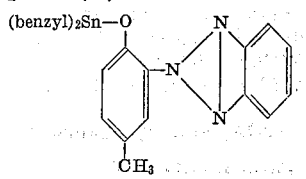

11. A composition as claimed in claim 1 wherein the organotin compound (A) is

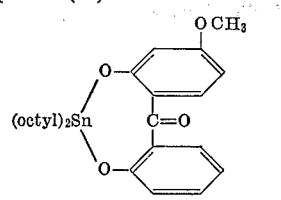

12. A composition as claimed in claim 1 wherein the organotin compound (A) is

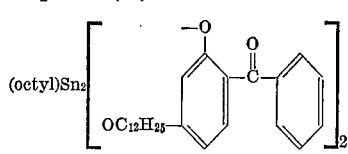

13. A stabilized polypropylene-containing composition comprising:

(A) an organotin compound of the general formula:

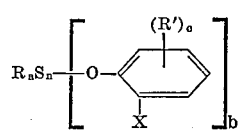

wherein R is a radical selected from the group consisting of alkyl of 1–12 carbon atoms, aryl, and benzyl, X is selected from the group consisting of residues of the formulae:

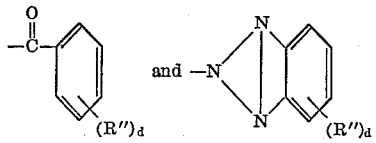

wherein R' and R'' are each selected from the group consisting of alkyl of 1–12 carbon atoms, alkoxy of 1–12 carbon atoms, phenyl, and oxygen exhibiting a direct bond to said Sn atom, $a$ and $b$ are each an integer from 1 to 3, and $c$ and $d$ are each an integer from 0 to 2;

(B) a compound of the formula:

$$(RO)_3P$$

wherein R is selected from the group consisting of hydrogen, alkyl of 1–18 carbon atoms, phenyl, alkaryl, and benzyl;

(C) a compound of the formula:

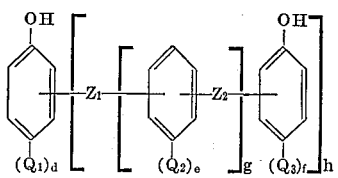

wherein $Q_1$, $Q_2$, and $Q_3$ are each selected from the group consisting of alkyl of 1–12 carbon atoms, alkoxy of 1–12 carbon atoms, radicals of the formulae:

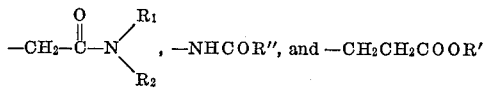

in which when not less than two radicals of each of $Q_1$, $Q_2$, and $Q_3$ attach to a benzene nucleus, they may be the same or different and R', R'', $R_1$, and $R_2$ are each alkyl of 1–18 carbon atoms, and hydroxyl such that not more than two of $Q_1$, $Q_2$, and $Q_3$ are hydroxyl when $h$ is 1, $Z_1$ and $Z_2$ are each selected from the group consisting of sulfur, oxygen, and alkylene of 1–4 carbon atoms, $d$, $e$, $f$, and $g$ are each an integer 1–3, and $h$ is an integer 0–1; and (D) a compound of the formula:

$$S(RCOOR')_2$$

wherein R is alkylene of 1–12 carbon atoms, and R' is alkyl of 1–18 carbon atoms.

14. A stabilizing polypropylene-containing composition as claimed in claim 13 wherein the organotin compound (A) is

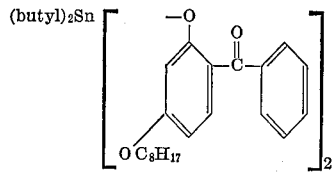

15. A stabilizing polypropylene-containing composition as claimed in claim 13 wherein the organotin compound (A) is

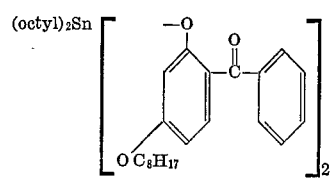

16. A stabilizing polypropylene-containing composition as claimed in claim 13 wherein the organotin compound (A) is

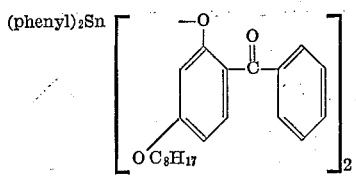

17. A stabilizing polypropylene-containing composition as claimed in claim 13 wherein the organotin compound (A) is

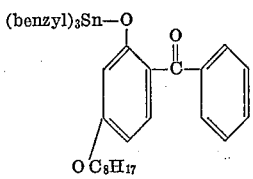

18. A stabilizing polypropylene-containing composition as claimed in claim 13 wherein the organotin compound (A) is

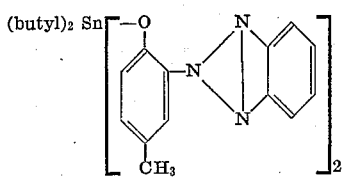

19. A stabilizing polypropylene-containing composition as claimed in claim 13 wherein the organotin compound (A) is

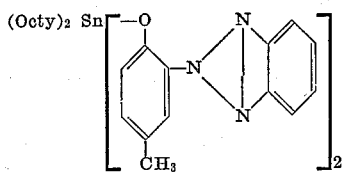

20. A stabilizing polypropylene-containing composition as claimed in claim 13 wherein the organotin compound (A) is

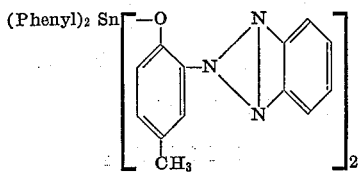

21. A stabilizing polypropylene-containing composition as claimed in claim 13 wherein the organotin compound (A) is

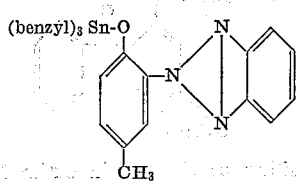

22. A stabilizing polypropylene-containing composition as claimed in claim 13 wherein the organotin compound (A) is

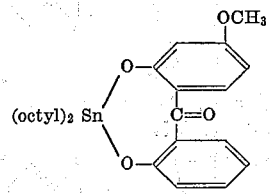

23. A stabilizing polypropylene-containing composition as claimed in claim 13 wherein the organotin compound (A) is

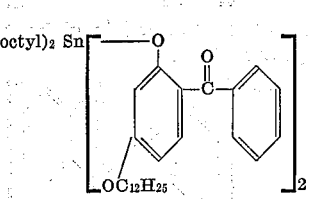

References Cited

UNITED STATES PATENTS

| | | | |
|---|---|---|---|
| 3,217,004 | 11/1965 | Hechenbleikner | 260—45.75 |
| 3,247,240 | 4/1966 | Mener et al. | 260—45.85 |
| 3,249,632 | 5/1966 | Peterson et al. | 260—45.85 |
| 3,255,136 | 6/1966 | Hicker et al | 260—23 |

DONALD E. CZAJA, Primary Examiner

U. P. HOKE, Assistant Examiner

U.S. Cl. X.R.

260—45.7, 45.95, 45.85, 45.9